(12) United States Patent
Barber et al.

(10) Patent No.: US 12,123,817 B2
(45) Date of Patent: *Oct. 22, 2024

(54) MINIATURE WIRELESS CONCENTRATION METER AND METHOD TO DETERMINE DENSITY AND CONCENTRATION

(71) Applicant: The Government of the United States of America, as represented by the Secretary of Homeland Security, Washington, DC (US)

(72) Inventors: Jeffrey Barber, Vineland, NJ (US); James C. Weatherall, Linwood, NJ (US); Duane Karns, Mays Landing, NJ (US); Barry T. Smith, Egg Harbor City, NJ (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,047

(22) Filed: Aug. 15, 2023

(65) Prior Publication Data

US 2024/0167929 A1    May 23, 2024

Related U.S. Application Data

(63) Continuation of application No. 17/827,384, filed on May 27, 2022, now Pat. No. 11,761,870.

(Continued)

(51) Int. Cl.
*G01N 11/00* (2006.01)
*G01N 21/45* (2006.01)
*G01N 27/06* (2006.01)

(52) U.S. Cl.
CPC ............ *G01N 11/00* (2013.01); *G01N 21/45* (2013.01); *G01N 27/06* (2013.01)

(58) Field of Classification Search
CPC .. G01N 9/00; G01N 9/24; G01N 9/26; G01N 9/36; G01N 29/02; G01N 29/024; G01N 29/022; G01N 2291/02818; G01F 23/2962

See application file for complete search history.

(56) References Cited

U.S. PATENT DOCUMENTS 3,486,381 A    12/1969   Farese
3,921,461 A *  11/1975   Layton .................... G01N 9/14
                                                       73/447

(Continued)

FOREIGN PATENT DOCUMENTS

CN       106213570 A  * 12/2016  ............... A24B 3/14
DE    102017008757 A1 *  3/2019

(Continued)

OTHER PUBLICATIONS

KR-101349796-B1 (Year: 2013).*

(Continued)

*Primary Examiner* — Kristina M Deherrera
*Assistant Examiner* — Fatemeh Esfandiari Nia
(74) *Attorney, Agent, or Firm* — Lavanya Ratnam; Robert W. Busby

(57) ABSTRACT

A device to determine density includes a housing, a first transducer disposed in the housing at a first position, and a second transducer disposed in the housing at a second position. The second transducer is located a distance from the first transducer. The device also includes a controller that reads a first output from the first transducer, and reads a second output from the second transducer. The controller (Continued)

determines a density of a liquid based on the first output, the second output, and the distance.

30 Claims, 8 Drawing Sheets

Related U.S. Application Data

(60) Provisional application No. 63/195,453, filed on Jun. 1, 2021.

(56) References Cited

U.S. PATENT DOCUMENTS

| | | | |
|---|---|---|---|
| 4,235,099 A | | 11/1980 | Ishizaka |
| 4,297,608 A | | 10/1981 | Jensen |
| 4,991,124 A | | 2/1991 | Kline |
| 5,546,813 A | | 8/1996 | Hastings et al. |
| 5,553,034 A | * | 9/1996 | Jones ............... G01N 9/26 175/48 |
| 6,551,558 B1 | * | 4/2003 | Mann ............... G01F 23/263 422/106 |
| 11,435,211 B2 | * | 9/2022 | Kippersund ............... G01F 1/74 |
| 2010/0257931 A1 | * | 10/2010 | Partington ......... G01F 23/2962 73/290 V |
| 2013/0313129 A1 | * | 11/2013 | Kosaka ............... G01N 29/02 73/61.41 |
| 2014/0157992 A1 | | 6/2014 | Farotto |
| 2014/0275863 A1 | | 9/2014 | Gabriel et al. |
| 2021/0163106 A1 | | 6/2021 | Sherry et al. |
| 2021/0364347 A1 | * | 11/2021 | Lopatin ............... G01H 11/08 |

FOREIGN PATENT DOCUMENTS

| | | | | |
|---|---|---|---|---|
| EP | 1179727 A1 | | 2/2002 | |
| EP | 2369305 A1 | | 9/2011 | |
| GB | 2479115 A | * | 10/2011 | ............ G01F 1/662 |
| KR | 101349796 B1 | * | 11/2013 | |
| RU | 2390755 C1 | | 5/2010 | |

OTHER PUBLICATIONS

CN-106213570-A (Year: 2016).*
DE-102017008757-A1 (Year: 2019).*
Hossain, Akram, and M. J. Dwyer. "A new type of liquid density transducer based on the principle of linear variable differential transformer." SIcon/01. Sensors for Industry Conference. Proceedings of the First ISA/IEEE. Sensors for Industry Conference (Cat. No. 01EX459). IEEE, 2001,"Hossain" (Year: 2001).*
Zhang, Jian, et al. "Determination of liquid density with a low frequency mechanical sensor based on quartz tuning fork." Sensors and Actuators B: Chemical 84.2-3 (2002): 123-128., "Zhang" (Year: 2002).*
Baronti, Federico, et al. "Wireless sensor node for surface seawater density measurements." Sensors 12.3 (2012): 2954-2968.", Baronti" (Year: 2012).*
Johansson, Jonny, et al., "A Compact Ultrasonic Transducer using the Active Piezoceramic Material as Electronics Carrier", EISLAB, Luleå Univ. of Tech., S-97455 Luleå Sweden, Ceramic Interconnect Technology Conference: Apr. 27, 2004-Apr. 28, 2004. American Ceramic Society, 2004.
Delsing, Jerker, et al., "Concepts and Architecture for a Thumb-Sized Smart IoT Ultrasound Measurement System", 2016 IEEE International Ultrasonics Symposium (IUS). IEEE, 2016.
Mohsin Saeed, "Measurement System to Monitor Interface Level Between Oil and Water in a Rapidly Rotating System" Stockholm, Apr. 2013.
Bamberger, J.A., et al., "Development of a Density Sensor for In-Line Real-Time Process Control and Monitoring of Slurries during Radioactive Waste Retrieval and Transport Operations at DOE Sites", Pacific Northwest National Laboratory-13719, UC-721, Nov. 2001.
Schumb, W.C., et al., Hydrogen Peroxide—Part Two—Office of Naval Research—AD022243, Dec. 1, 1953.
TDC-GP2 Time to Digital Converter—TDC_PMT, Precision Measurement Technologies, https://www.pmt-fl.com/time-to-digital-converters/tdc-gp2, accessed Feb. 10, 2021.
Ultrasonic Density Meter_ Precision Measurement Technologies, https://www.pmt-fl.com/time-to-digital-converters/tdc-ultrasonic-density-meter, accessed Feb. 10, 2021.
Adamowski et al.—Ultrasonic measurement of density of liquids, J. Accoustical Society of America, 97(1), pp. 354-361, Jan. 1995.
BCM Sensor Technologies, Model SE105, Flip-Chip Absolute Pressure Sensor Dies, www.bcmsensor.com, accessed on Feb. 10, 2021.
Ethanol Water Mixtures—Densities vs. Temperature, Density of Ethyl Alcohol aqueous solutions, https://www.engineeringtoolbox.com/ethanol-water-mixture-density-d_2162.html, accessed on May 10, 2022.
Common Techniques to Calibrate Thermocouples, Omega, https://www.omega.com/en-us/resources/calibrating-thermocouples, Jan. 6, 2020.
MC-00006-R12-FRI-Refractive-Index-sensor-datasheet, FISO Technologies Inc., https://fiso.com/wp-content/uploads/2020/03/MC-00006-R12-FRI-Refractive-Index-sensor-datasheet.pdf, accessed Feb. 10, 2021.
Optofluidic sensing—microcavities for I, Open-access optical microcavities for lab-on-a-chip refractive index sensing (RSC Publishing), https://pubs.rsc.org/en/content/articlelanding/2014/lc/c4lc00817k, Apr. 29, 2022.
B.B. Spencer "Simultaneous Determination of Nitric Acid and Uranium Concentrations in Aqueous Solution From Measurements of Electrical Conductivity, Density, and Temperature", Fourth International Conference on Facility Operations—Safeguards Interface, Sep. 29-Oct. 4, 1991, Albuquerque, New Mexico.
Submersible Pressure Transducers, Variohm Eurosensor, https://www.variohm.com/products/pressure-sensors, Apr. 16, 2020.
Nowakowska, Janina, "The Refractive Indices of Ethyl Alcohol and Water Mixtures", Loyola University Chicago, Mar. 1939.
Using absolute pressure sensors to measure hydrostatic level, https://www.sensorsone.com/using-absolute-pressure-sensors-to-measure-hydrostatic-level/, accessed Apr. 29, 2022.
Variation of Pressure with Depth in a Fluid, Physics, https://courses.lumenlearning.com/physics/chapter/11-4-variation-of-pressure-with-depth-in-a-fluid/, accessed Apr. 29, 2022.

* cited by examiner

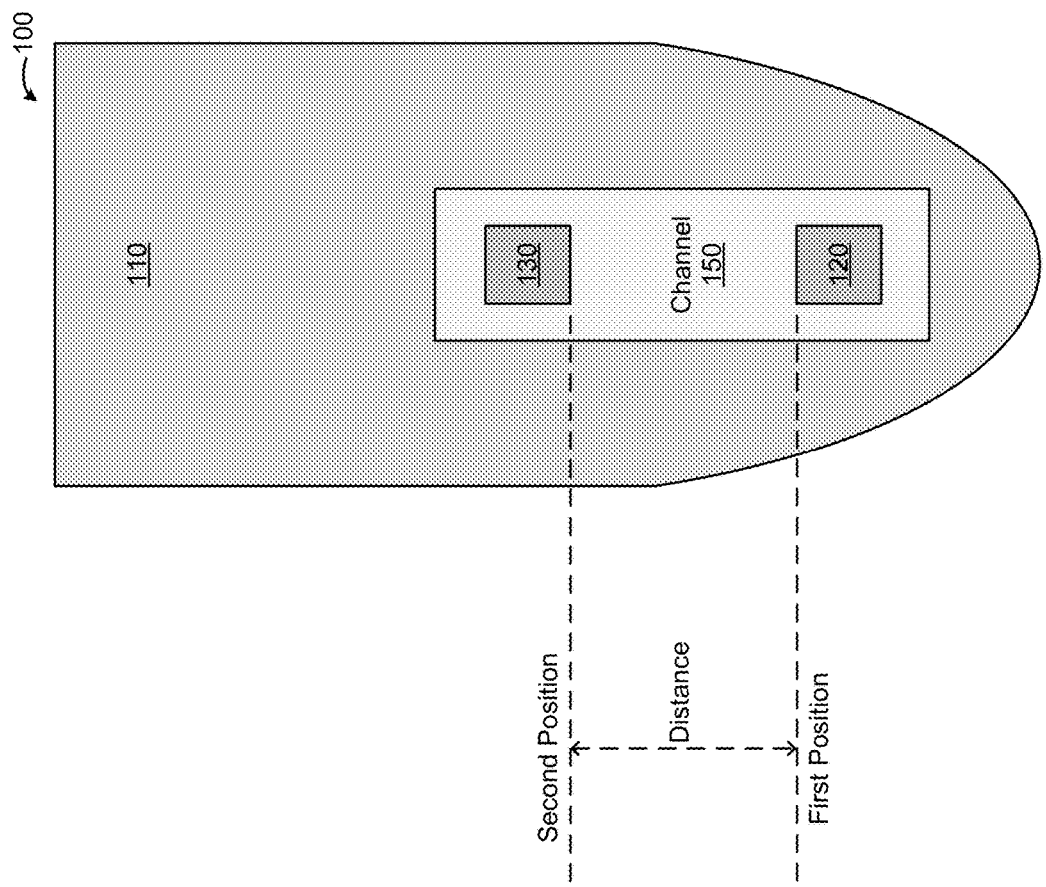
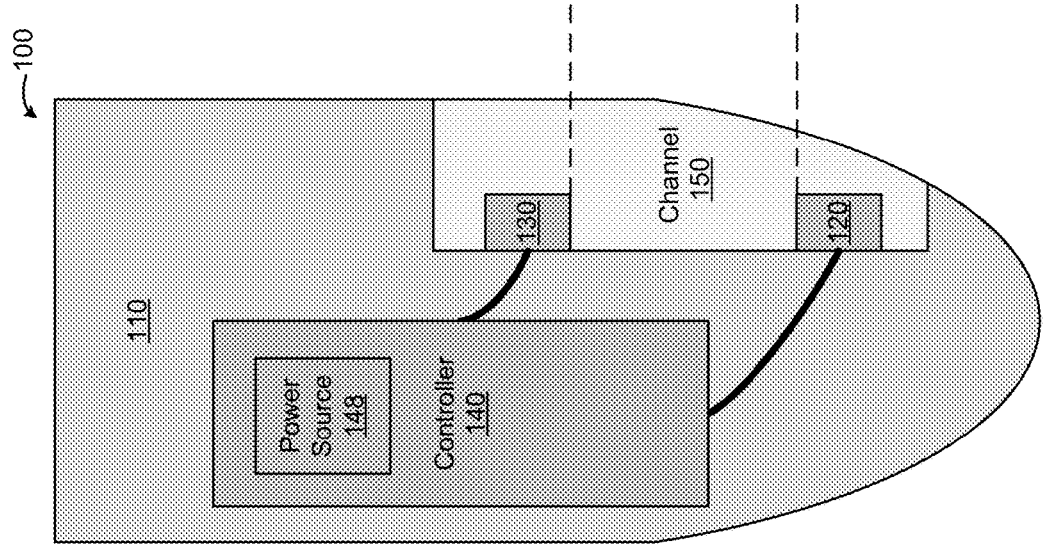

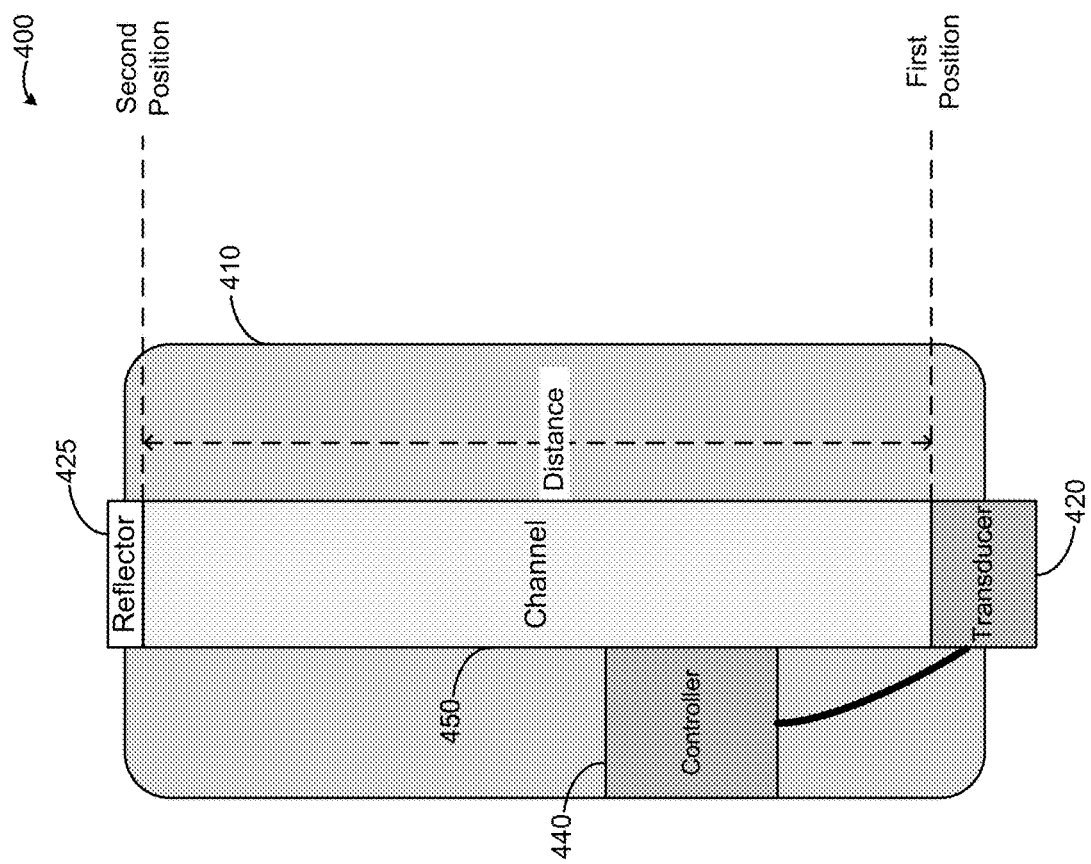

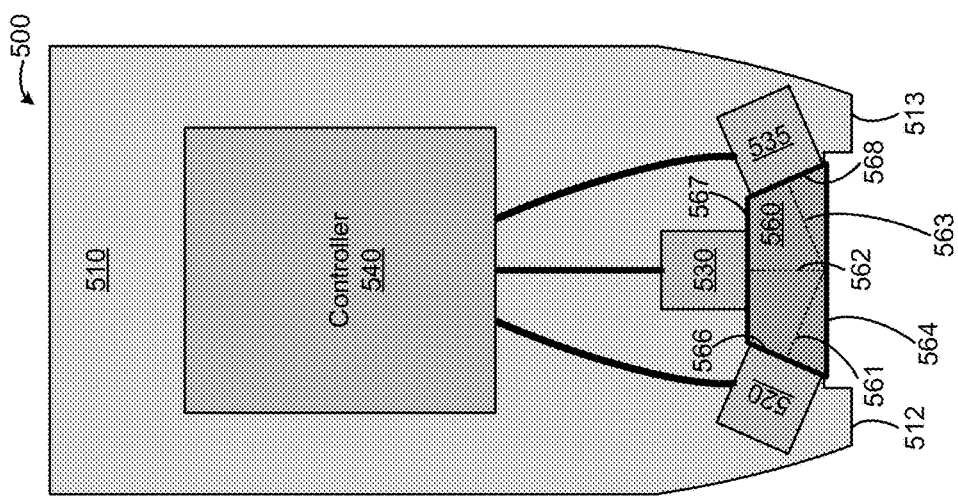

MINIATURE WIRELESS CONCENTRATION METER AND METHOD TO DETERMINE DENSITY AND CONCENTRATION

CROSS-REFERENCE TO RELATED APPLICATIONS

This application is a non-provisional continuation of U.S. non-provisional application Ser. No. 17/827,384, now U.S. Pat. No. 11,761,870, filed on May 27, 2022, entitled "Miniature Wireless Concentration Meter," that claims the benefit of priority from U.S. provisional application 63/195,453 filed on Jun. 1, 2021, entitled "Miniature Wireless Density Meter," the disclosures of all of which are incorporated by reference in their entireties.

STATEMENT OF GOVERNMENT INTEREST

The present invention was made by employees of the United States Department of Homeland Security in the performance of their official duties. The Government has certain rights in the invention.

FIELD

The discussion below relates generally to sensing properties of liquids, such as hazardous chemicals related to explosives or high concentration propellants.

BACKGROUND

This section provides a brief introduction to the technical subject matter without distinguishing what aspects of the technology are or are not in the prior art. Nothing in this section amounts to an admission regarding the prior art.

Density meters are available to check the density of samples. However, some density meters are large pieces of equipment that may need a liquid to be passed through a sampling hose, or otherwise need to disturb the liquid or remove the liquid from its container. Furthermore, density meters may be based on sampling technologies that cannot easily distinguish between different materials having similar dielectric constants. Such meters are not usable for solutions where the different liquids have similar dielectric constants.

SUMMARY

In an embodiment, a device to determine density includes a housing, a first transducer disposed in the housing at a first position, and a second transducer disposed in the housing at a second position located a distance from the first transducer. The device also includes a controller that reads a first output from the first transducer, and a second output from the second transducer, and determines a density of a liquid based on the first output, the second output, and the distance.

In an embodiment, a device to perform measurements includes a housing, a transducer disposed in the housing at a first position, and a reflector disposed in the housing at a second position located a distance from the transducer. The device also includes a controller that reads output from the transducer and determines a density of a liquid based on the output and the distance.

In another embodiment, a device to perform measurements includes a housing, and a wedge structure coupled to the housing. The wedge structure includes an exposed surface to come in contact with a liquid, and a plurality of facets. The device includes a first transducer disposed in the housing coupled to a first facet of the wedge structure at a first angle of incidence relative to the exposed surface. The device also includes a second transducer disposed in the housing, coupled to a second facet of the wedge structure at a second angle of incidence relative to the exposed surface. The device further includes a controller that reads first output from the first transducer and second output from the second transducer, and determines a density of the liquid based on the first output and the second output.

In another embodiment, a device to sense properties of liquids includes a housing, a first transducer disposed in the housing at a first position, and a second transducer disposed in the housing at a second position located a distance from the first transducer. The device also includes a controller coupled to the first transducer and the second transducer to read a first output from the first transducer, and a second output from the second transducer. The controller includes a transceiver coupled to the controller. The controller is configured to direct the transceiver to transmit the first output and the second output through a liquid to an external receiver, for use in determining a density of the liquid.

Other features and aspects of various embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

FIG. 1 illustrates a cross-section side view of a meter including a first transducer and a second transducer according to an embodiment.

FIG. 2 illustrates a cross-section front view of the meter of FIG. 1 according to an embodiment.

FIG. 4 illustrates a cross-section side view of a meter including a transducer and a reflector according to an embodiment.

FIG. 5 illustrates a cross-section side view of a meter including a wedge structure according to an embodiment.

DETAILED DESCRIPTION

Figure 3:
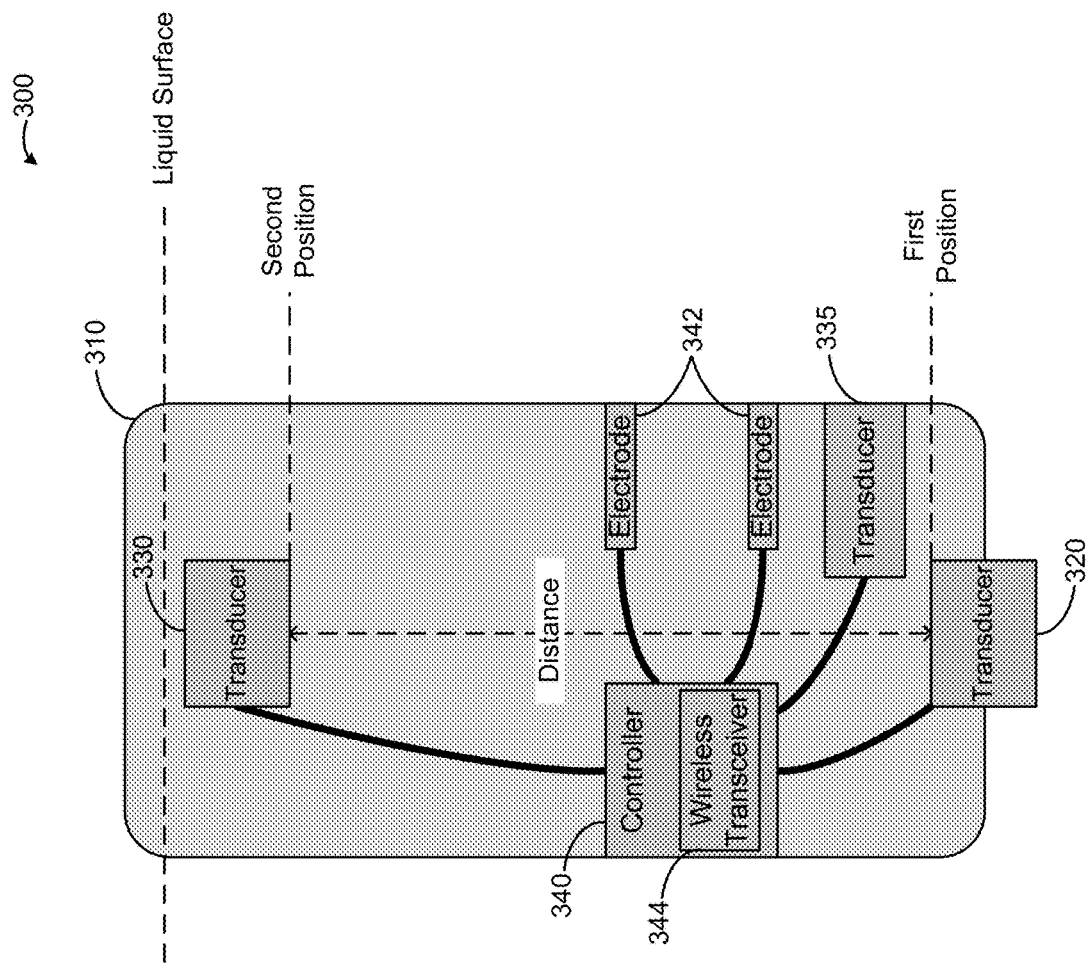
FIG. 3 illustrates a cross-section side view of a meter including electrodes and a wireless transceiver according to an embodiment.

A miniature wireless density meter includes transducers, such as sensors, transmitters, emitters, receivers, and the like. The meter is formed as a relatively compact capsule package that can fit through small openings, such as the openings of evaporation flasks. The transducers can include ultrasonic transducers, micro-pressure transducers, temperature transducers, and the like. The transducers are arranged in or on the capsule package to allow for sensing or taking measurements while the capsule package is submerged in or floating on top of a liquid in a container. The meter can be operational while the container of liquid is stationary or in motion, e.g., while the container is rotating. As used herein, the term liquid includes materials, such as those formed of mixtures of different liquids or component ingredients.

Embodiments of the meter can be used when preparing hazardous liquids. For example, an embodiment of the meter can report the density and temperature of a hydrogen peroxide solution in water, to support the synthesis of high-concentration hydrogen peroxide for chemical operations or as a rocket propellant. Embodiments of the meter also can be used to monitor the concentration of solutions during distillation without disruption or interruption of the distillation process. Thus, the meter enables efficient, safe, and cost-effective methods of synthesizing liquids. Such methods, involving embodiments of the meter, can be used to facilitate testing and evaluation of, e.g., homemade explosives.

Embodiments of the meter can communicate wirelessly, and can determine densities of liquids based on transmission measurements or reflection measurements, e.g., based on ultrasonic techniques, which may include an internal reference standard. The miniature wireless density meter can be inserted into a flask of a rotary evaporator to, e.g., monitor the density of the liquid as one of the components is distilled off. An embodiment collects time-of-flight data, and wirelessly transmits the data to a receiver external to the liquid. The receiver external to the liquid can use the data to determine the density of the liquid. An embodiment of the meter can fit through a 20 mm aperture, and can float while keeping the transducers submerged. Another embodiment can fit through a 20 mm aperture and remain submerged while the container of the liquid is rotating or otherwise changing its orientation, e.g., as part of a distillation process.

The meter can include sensors or transducers arranged in various combinations or configurations. A transmission configuration involves a transmitter of the meter generating an ultrasonic wave, allowing the wave to propagate through the liquid, and a receiver of the meter sensing the wave. A transmission-reflection configuration involves an ultrasonic transceiver of the meter generating an ultrasonic wave, allowing the wave to propagate through the liquid and reflect off a surface (e.g., a reflector) of the meter, then allowing the wave to return and sensing the wave by the ultrasonic transceiver. A reflection configuration involves an ultrasonic transceiver of the meter generating an ultrasonic wave, and sensing, by the ultrasonic transceiver of the meter, reflection of the ultrasonic wave off the transceiver/liquid interface.

The meter can be constructed as a capsule package that sinks to the bottom of a container of the liquid, or that floats at the top of the liquid in the container. The capsule package can contain the transducers inside of the capsule package, and can be designed to allow liquid to flow inside the capsule package to interact with the transducers. The capsule package can contain the transducers on an outside surface of the capsule package, to expose the transducers to the liquid. A controller can include components such as chips, wiring, electronics, batteries, and the like. At least a portion of the components or controller may be encapsulated in an inert material, such as a Teflon™ or an epoxy. The encapsulation is suitable to withstand chemicals in a given liquid solution in which the meter is intended to operate. Embodiments may include electrodes that conduct in the liquid or otherwise sense the presence of the liquid, to activate the electronics of the meter and enable the meter to measure and wirelessly transmit data.

FIG. 1 illustrates a cross-section side view of a meter 100 including a first transducer 120 and a second transducer 130 according to an embodiment. The meter 100 is formed as an elongated package including housing 110, the first transducer 120, the second transducer 130, controller 140, and channel 150. The first transducer 120 is located in the channel 150 at a first position, and the second transducer 130 is located in the channel 150 at a second position. The first position and the second position cause the first transducer 120 and the second transducer 130 to be separated by a distance, shown along a vertical axis as illustrated in FIG. 1.

The housing 110 can be formed from various materials. In an embodiment, the housing 110 is made of plastic such as polytetrafluoroethylene (PTFE) which is resistant to most chemicals including acids and oxidizers. The housing of the illustrated embodiment provides an elongated package having a first end that is ovoid and a second end that is cylindrical. The housing 110 is configured to provide the meter 100 with a buoyancy to orient the first transducer 120 and the second transducer 130. The various components of the meter 100 also can be arranged and configured to provide a given buoyancy or cause the meter 100 to assume a given orientation when placed in liquids. The meter 100 can be constructed with a buoyancy that, when placed in the liquid, positions the first transducer 120 at a first depth in the liquid, and the second transducer 130 at a second depth in the liquid different than the first depth, corresponding to the distance. Furthermore, the meter's neutral buoyancy can be tailored to cause the meter 100 to float or submerge to a desired depth or position in the liquid. Such positions can be associated with different configurations including: a portion of the meter 100 extending above a surface of the liquid, being at the surface of the liquid, or being below a surface of the liquid to a desired depth, or contacting a floor of the container holding the liquid, whether the meter 100 remains upright or lays down sideways on the floor.

The housing 110 includes the channel 150 configured to admit the liquid. The first transducer 120 is disposed in the channel 150 at the first position. The second transducer 130 is disposed in the channel 150 at the second position. The first transducer 120 and the second transducer 130 are recessed into the channel 150, protecting them from contact or damage. The channel 150 is wide enough to admit liquid, allowing space around the first transducer 120 and the second transducer 130. The channel 150 allows signals to readily pass between the first transducer 120 and the second transducer 130 through the liquid.

The controller 140 includes electronics and other components to enable the meter 100 to operate. In an embodiment, the controller 140 reads a first output from the first transducer 120, and a second output from the second transducer 130, and transmits such data externally without locally determining a density at the controller 140. In another embodiment, the controller 140 includes a processor to analyze data, look up data, and perform other calculations involved in performing a local (e.g., on-board the meter 100) determination of the density of the liquid. The controller 140 may include electronics such as a power source 148, whether a battery, a capacitor, or other power storage device. The power source 148 can be charged via electrodes (see electrodes 342 of FIG. 3). In an embodiment, the controller 140 may include an inductive coil to charge the power source 148 via inductive charging. The inductive charging allows for charging while ensuring the capsule remains sealed.

In an embodiment, the controller 140 determines a density of a liquid based on the first output from the first transducer 120, the second output from the second transducer 130, and the distance. For example, the first transducer 120 and the second transducer 130 are pressure sensors, which register different pressures based on respective depths at which they are submerged in the liquid. The controller 140 uses the distance between transducers and an angle of orientation of the meter 100 to determine the difference in depth between the first transducer 120 and the second transducer 130. The controller 140 uses the first output from the first transducer 120, and the second output from the second transducer 130, to perform a pressure differential calculation. In an embodiment, the controller 140 can include a lookup table, on which the controller 140 performs a look up using the type of liquid and the sensed pressure differential, to determine the density of that type of liquid.

In an embodiment, the controller 140 can perform a pressure differential calculation as follows, to determine density (rho). The controller 140 implements a form of the following equation $P=h*rho*g$, where h is height, rho is density and g is the gravity constant. Because the meter 100 orients at least two sensors at different heights submerged in the liquid, the controller 140 can obtain the density using the different heights (h1, h2) and the corresponding different pressures (P1, P2) as sensed by those sensors. Accordingly, the controller 140 determines density from $Rho=(P1-P2)/[g(h1-h2)]$. Alternatively, the controller 140 can receive a local atmospheric pressure measurement (e.g., made off-sensor at a receiver unit location in communication with the controller 140). The controller 140 can use the local atmospheric pressure measurement to compensate for local atmospheric pressure (h1=0), then make a single measurement sensed in the liquid at depth h2 (corresponding to the first position or the second position). The controller 140 then can use the compensated pressure and sensor pressure in the pressure differential equation above. Thus, the controller 140 can include a chip to perform density determinations based on differential pressure between two sensed pressures as sensed by the first transducer 120 and the second transducer 130, or based on a pressure reading sensed by one sensor in conjunction with atmospheric pressure (e.g., as measured off-sensor at a remote receiver), or other approaches. In embodiments, the controller 140 can include sensors that can sense absolute pressure (e.g., Model SE105 from BCM Sensor Technologies by), absolute reference hydrostatic level pressure sensors, gauged sensors, and the like.

In an embodiment, the meter 100 is based on an elongated package formed by housing 110 having a diameter of 18 mm and a length of 32 mm. These dimensions enable the meter 100 to be inserted through an opening having a diameter of 18 mm. The housing 110 can be formed of a material having a different density than the controller 140, enabling the arrangement of the controller and housing 110 to affect the buoyancy and orientation of the meter 100 when placed in liquid. In an embodiment, the controller 140 is positioned at an offset along the length of the housing 110, and the housing 110 is buoyant to cause the meter 100 to orient vertically when submerged partially or fully in a liquid. The vertical orientation of the meter 100 causes the first transducer 120 to be positioned at a first location in the liquid, and the second transducer 130 to be positioned at a second location in the liquid.

A given transducer is depicted for the sake of clarity as a single individual transducer. However, an illustrated transducer can represent multiple sensors, such as an emitter/receiver pair of transducers. In an embodiment, the first transducer 120 and the second transducer 130 can be ultrasonic transceivers. The meter 100 can use ultrasonic transceivers to determine a density of the liquid, based on the distance between the first transducer 120 at position 1 and the second transducer 130 at position 2, and the time it takes for an ultrasonic wave to travel from the first transducer 120 to the second transducer 130. The meter 100 can be based on a capsule package that arranges the first transducer 120 and the second transducer 130 facing each other, with channel 150 allowing the liquid to pass between the first transducer 120 and the second transducer 130. The channel 150 protects the first transducer 120 and the second transducer 130 from damage during motion of the meter 100, while allowing liquid to fill the space between the first transducer 120 and the second transducer 130.

In an embodiment, the controller 140 can include a chip such as the TDC-GP2 general-purpose Time-to-Digital Converter (TDC) for determining time-of-flight measurements from the first transducer 120 and the second transducer 130 with high precision. The TDC-GP2 has a single shot resolution of 22 ps and a 4 ms measurement range, with physical package size of 5 mm length, 5 mm width, and 1 mm height. The TDC-GP2 also supports special function blocks such as a fire pulse generator, stop enable, temperature measurement, and clock control. Such a chip has sufficient performance to measure small changes in time-of-flight measurements, corresponding to density changes. For example, the velocity of sound (e.g., ultrasonic transducer output) in water is approximately 1483 m/s (at 20 degrees Celsius). Example changes in the velocity of sound through liquid correspond to changes of speed in the range of roughly 1200 m/s to 1800 m/s. For a distance of roughly 2 cm (e.g., a distance between a first transducer 120 and a second transducer 130, or a doubled distance between a transducer and a reflector as illustrated in FIG. 4), such speed changes would correspond to time delays of 10 μs to 20 μs. For an upper velocity in liquid of 10,000 m/s, the delay times of a few microseconds would fall within the timing resolution of the TDC-GP2 chip, which can detect down to a resolution of 22 ps. Accordingly, the TDC-GP2 chip can provide time-of-flight measurements for relatively small distances, allowing for the meter 100 to have a relatively small package size on the order of centimeters or millimeters.

FIG. 2 illustrates a cross-section front view of the meter 100 of FIG. 1 according to an embodiment. The meter 100 includes housing 110 with a channel 150. First transducer 120 and second transducer 130 are positioned in the channel 150. The channel 150 is illustrated with spacing for liquid to come in contact with the first transducer 120 and the second transducer 130. In another embodiment, the channel 150 is narrower or shorter to contact at least one side of the first transducer 120 or the second transducer 130. The front view of the meter 100 of FIG. 2 depicts the housing 110 having an outer cross-section shape that is the same as that of FIG. 1, due to the rotational symmetry of the housing 110 about a vertical axis. In an embodiment, the housing 110 has a cylindrical upper end and a rounded lower end. In another embodiment, the housing 110 is based on a rectangular prism, with a lower end that is rounded off.

FIG. 3 illustrates a cross-section side view of a meter 300 including a plurality of electrodes 342 and a wireless transceiver 344 according to an embodiment. The meter 300 also includes housing 310, first transducer 320, second transducer 330, third transducer 335, and controller 340.

The plurality of electrodes 342 are mounted to the housing 310 and coupled to the controller 340 to communicate their status to the controller 340. Based on the status of electrodes 342, the controller 340 can adjust operation of the meter 300. In an embodiment, the controller identifies a status of the electrodes 342 as being dry or immersed in a liquid, and activates the first transducer 320, the second transducer 330, or the third transducer 335 based on the status of the plurality of electrodes 342. The controller 340 can, e.g., activate and deactivate components responsive to determining that the meter 300 is immersed in liquid, based on ascertaining the status of the plurality of electrodes 342. The controller 340 can monitor multiple transducers simultaneously.

The housing 310 can position the various components in various locations on the meter 300 according to how the meter uses that component, or how that component can affect operation of the meter. For example, an electrode 342 or a plurality of electrodes 342 may be positioned above or below the first transducer 320, the second transducer 330, or the third transducer 335. The electrodes 342 may be positioned to ensure that, when the electrodes 342 signal that they are experiencing a status of being immersed in the liquid, at least the first transducer 320, the second transducer 330, and the third transducer 335 are also immersed in the liquid. In an embodiment, the housing 310 is structured with a density to give the meter 300 a buoyancy that takes into account the density of the controller 340 and other components. The housing 310 is tailored to adjust the buoyancy to cause the meter 300 to float or sink to a given level in a given type of liquid while maintaining a given orientation of the meter 300. In the illustrated example of FIG. 3, the housing 310 and components are configured and arranged to cause the meter 300 to assume the illustrated vertical orientation and remain nearly fully submerged into the liquid relative to the indicated liquid surface in a solution of hydrogen peroxide.

The controller 340 includes a wireless transceiver 344 to wirelessly transmit through the liquid. In an embodiment, the controller 340 includes a chip that supports wireless data standards such as Bluetooth, ZigBee, Wireless USB, and the like to wirelessly transmit and receive. The controller 340 uses the wireless transceiver 344 to transmit sensor information collected by the controller 340, such as a readout of information as collected by the first transducer 320, the second transducer 330, the third transducer 335, and the plurality of electrodes 342. The controller 340 also can use the wireless transceiver 344 to transmit or receive information related to calculations performed by the controller 340 (e.g., calculated density), or directions from an external controller to query or otherwise interact with the controller 340 and meter 300. For example, the controller 340 can receive a signal via wireless transceiver 344 instructing the controller 340 to go into a power saving mode where the first transducer 320, second transducer 330, third transducer 335, or plurality of electrodes 342 are in a low power or powered off state. The controller 340 can wirelessly transmit status information based on the sensed information. For example, the controller 340 can sense the temperature via the third transducer 335, and wirelessly transmit the temperature as a readout to the user. The controller 340 can wirelessly transmit various readouts corresponding to the various components, including the first transducer 320, the second transducer 330, the third transducer 335, and the plurality of electrodes 342. The controller 340 also can wirelessly transmit readouts of calculated information, such as time of flight duration, velocity of the acoustic wave, density of the liquid, and the like.

The third transducer 335 may be configured as a temperature sensor, to sense a temperature of a liquid in which the meter 300 is immersed. The controller 340 reads third output from the third transducer 335, and uses the third output to determine the density of the liquid based on the outputs from the other transducers. For example, the controller 340 determines the time of flight duration, and performs a look up in a density lookup table based on the duration and temperature for a given type of liquid.

The controller 340 can use the third output from the third transducer 335 to compensate for thermal expansion. In an embodiment, the controller 340 determines a distance adjustment for the housing 310, corresponding to the temperature. Based on the sensed temperature, the controller 340 adjusts a value that the controller 340 uses to determine the density of the liquid, to correct for thermal expansion of the device. The value that the controller 340 uses for such determinations corresponds to the distance between the first transducer 320 and the second transducer 330, adjusted for temperature based on a coefficient of thermal expansion of the material of the housing 310. In an embodiment, the controller 340 stores a lookup table of multiple distances indexed by temperature, which the controller 340 accesses to determine an appropriate distance adjustment for a given temperature of the liquid. The controller 340 also may store a lookup table of liquid properties (e.g., bulk moduli), indexed by temperature and type of liquid, which the controller 340 uses when determining the density of the liquid. Using density and temperature, the controller 340 can calculate the concentration of the solution present in an evaporating flask. In another embodiment, an external controller in wireless communication with the controller 340 receives information from the controller 340 that can be used externally to calculate the density, solution concentration, or other aspects of the liquid in which the meter 300 is immersed.

Embodiments are particularly useful for measuring liquids involving hydrogen peroxide (HP), such as HP dissolved in water. The dielectric constant of HP is similar enough to that of water to cause difficulties when using density meters based on, e.g., radio frequency transducers or microwave transducers. However, embodiments described herein can use other types of transducers, e.g., pressure transducers or ultrasonic transducers, which are not subject to such measurement difficulties. In addition to density, embodiments can determine HP concentration by index of refraction at ~589 nm (sodium D), e.g., using transducers that measure index of refraction and temperature. For example, embodiments can be based on a liquid-filled Fabry-Perot optical cavity, whose length variations the controller can sense to precisely determine the bulk refractive index of the liquid. The liquid-filled optical cavity length varies in direct proportion with the refractive index of the liquid sample. The refractive index measurement can be achieved by measuring the Fabry-Perot cavity length using white-light interferometry technology. See Giguère, Paul A., and Pierre Geoffrion, "Refractive index of hydrogen peroxide solutions. A revision," Canadian Journal of Research 27.3 (1949): 168-173. Other embodiments can use open-access optical microcavities to provide optofluidic sensing. Embodiments also can determine a concentration of ingredients in a liquid, based on the approaches described herein including index of refraction data, density data, and the like. For example, embodiments can determine a concentration of nitric acid or urea nitrate in a nitric acid/urea nitrate/water system, hydrogen peroxide in a water solution, ethanol or water in brewing or winemaking liquids, salt in water solutions, and so on. Embodiments can perform such determinations using various techniques as described herein, including techniques based on conductivity measurements, density measurements, resistivity measurements, concentration measurements, and the like. See Spencer, B. B., "Simultaneous determination of nitric acid and uranium concentrations in aqueous solution from measurements of electrical conductivity, density, and temperature," No. CONF-910901-1. Oak Ridge National Lab., 1991.

In an embodiment, a wireless meter is programmed with a lookup table, an equation, or other logic to determine a concentration of an ingredient of a liquid, based on the wireless meter sensing, e.g., a measurement of temperature, index of refraction, conductivity, resistivity, or the like. Information about liquid behaviors is available, such as in the data tables of white papers. Information about the liquids also can be obtained by collecting measurements of test liquids. For example, the index of refraction (or other characteristics such as conductivity, resistivity, and the like) of a liquid can be measured using a precise laboratory instrument. Such measurements can be performed at different concentrations of the liquid at a single temperature and at multiple temperatures. The measured laboratory data can then be fit to a model, such as a mathematical polynomial function or equation (e.g., a third-order polynomial) that fits to the characteristics of the liquid over a range of values. The measured laboratory data can be extrapolated using the model, to create a lookup table of index of refraction (or other characteristics such as conductivity, resistivity, and the like). In an embodiment, the wireless meter includes software code to solve for the value of interest (e.g., one of the values as represented as a variable in the polynomial function), based on inversion of the equation or model. Compared to a lookup table approach, the software code approach is more compact in terms of data storage, and would need more processing capability than a lookup table approach. Accordingly, embodiments of the wireless meter allow for flexibility in choice of controller capabilities and storage capabilities, depending on whether the meter uses lookup tables, software code to manipulate a mathematical function or equation, or a combination of both approaches.

As set forth above, an embodiment uses ultrasonic transducers to perform a transmission measurement from the first transducer 320 to the second transducer 330 across a distance to measure time-of-flight data and derive a density of the liquid. More specifically, in an embodiment based on ultrasonic transducers, the controller 340 determines (or an external controller in communication with the controller 340 via wireless transceiver 344 determines) the density of the liquid by performing a transmission measurement. The transmission measurement corresponds to the distance through the liquid between the first transducer 320 and the second transducer 330. The controller 340 measures time-of-flight information corresponding to a measured velocity. The measured velocity is proportional to the time-of-flight information, a bulk modulus of the liquid, K, and the density of the liquid, rho. The density, in turn, is dependent on the material (e.g., a type of liquid) and temperature. The controller 340 can consult a lookup table or use other approaches to identify a bulk modulus corresponding to a type of the liquid. The controller 340 then determines the density of the liquid based on the temperature of the liquid and the bulk modulus of the liquid. In an embodiment, the controller 340 is preconfigured for use with given types of liquids, and stores the corresponding bulk moduli of those liquids. In another embodiment, the controller 340 is configured to be programmable to receive a type of liquid as input, and look up a bulk modulus corresponding to the type of liquid. For example, a user can configure the controller 340 by inputting liquid type as "hydrogen peroxide." The controller 340 determines the bulk modulus corresponding to hydrogen peroxide, and used the bulk modulus to determine a density of the liquid. In another example, the user inputs a numeric value for the bulk modulus directly, which the controller 340 uses to determine liquid density. Such an approach is helpful in situations involving a mixture of different types of liquids, or where the type of liquid is not readily labeled or categorized.

In an embodiment, the meter 300 itself contains sensing hardware, but may or may not directly perform calculations to determine the density of the liquid. The meter 300 can wirelessly transmit signals to be received by a hardware-based or software-based receiver unit, such as a standalone unit or a personal computer (PC) running receiver software and configured to serve as a receiver unit. The meter 300 transmits signals from the transducer 320, transducer 330, and transducer 335, and may or may not translate transducer signals to a density determination. The density determination can be performed by the receiver unit. In an embodiment, the meter 300 allows for configuration selections via a computer user interface of receiver software running on a receiver unit PC in communication with the meter via the wireless transceiver 344. The configuration selections include turning on or off the meter 300, placing the meter 300 in a low-power state, adjusting a frequency of how often the meter 300 take measurements, configuring a type of liquid in which the meter 300 is immersed, adjusting a power level, power state, or operational state of one or more elements (controllers, sensors, transducers, controllers, transceivers, etc.), directing the meter 300 to take readings at the present time or a future time, and so on.

The meter 300 or the receiver unit can use information to convert density of the liquid to concentration, such as a lookup table or function corresponding to the system of interest (e.g. a system of hydrogen peroxide and water, ethanol and water, and so on). The user can select the system of interest, e.g., on the receiver unit using a software dropdown menu, or by toggling through stored systems, or the like. In an embodiment, the controller 340 of the meter 300 is programmable to store or otherwise operate with additional systems, e.g., as desired by the user as new systems are quantified. In another embodiment, the software on the receiver unit is programmable to interact with the meter 300 to provide additional system information, to allow the meter 300 to operate in, perform calculations in, or interact with such additional systems.

In another embodiment, the first transducer 320 and second transducer 330 are pressure transducers, and the third transducer 335 is a temperature transducer. The pressure transducers may be micro-pressure transducers, and may be separated by an accurately-known distance along a height of the liquid based on the separation distance between transducers, an orientation of the meter 300, and positions of the first transducer 320 and the second transducer 330 when the meter 300 is immersed in the liquid. The meter 300 measures output relating to pressure from the first transducer 320 and the second transducer 330, along with output relating to temperature from the third transducer 335. In an embodiment, the meter 300 uses the wireless transceiver 344 to transmit data from the first transducer 320, the second transducer 330, and the third transducer 335 to an external controller or receiver that calculates density. In another embodiment, the meter 300 (e.g., using the controller 340 that is part of its electronics) performs the density calculation locally based on such data. The meter 300 or external controller can use the measured temperature to correct for any thermal expansion of the measurement setup. Such correcting accommodates changes in the distance between transducers, reflectors, and the like caused by thermal expansion of the meter's capsule package including housing 310. Additionally, the meter 300 or external receiver uses the temperature measurement to correct bulk properties of the liquid, such as a bulk modulus of the liquid. The density of an aqueous solution is dependent on the concentration of the solute and the temperature. Therefore, the meter 300 or external receiver can measure the density and temperature, to determine solute concentration of a liquid.

FIG. 4 illustrates a cross-section side view of a meter 400 including a transducer 420 and a reflector 425 according to an embodiment. The meter 400 also includes housing 410, controller 440 mounted to the housing 410, and channel 450 formed in the housing 410. The channel 450 accommodates the transducer 420 at a first position, and reflector 425 at a second position located a distance from the first position of the transducer 420.

The channel 450 can be formed as a slot in the housing 410, with a sensor or transducer 420 at one end, and the reflector 425 at the other end. The illustrated embodiment includes a channel 450 spanning nearly the entire length of the housing 410. In other embodiments, the channel 450 can be shorter or longer, with a corresponding change in distance between the transducer 420 and the reflector 425.

The meter 400 uses the reflector 425 to obtain measurements through the liquid based on an effective distance that is twice the channel length distance. The reflector 425, located at one end of the channel 450, reflects signals emitted from the transducer 420, located at the other end of the channel 450. The reflector 425 reflects the signals back to the transducer 420, which is configured to receive signals. In another embodiment, the transducer 420 is provided as an emitter/receiver pair of transducers. In an embodiment, the reflector 425 can be formed of the same material as the housing 410. In another embodiment, the reflector 425 can be formed of materials, such as plastic, metal, ceramic, glass, and the like, suited to reflect signals in view of the type of transducer 420. In an embodiment, the reflector 425 is formed of plastic to reflect acoustic signals from the transducer 420 propagating through a solution of hydrogen peroxide and water.

The meter 400 can perform a calibration under controlled conditions (known liquid at known liquid temperature and temperature of the meter 400). The calibration can be used to, e.g., adjust the value representing the effective distance that is used in calculations. The meter 400 can calibrate its ultrasonic sensors using a known liquid, to determine the distance between the transducers or sensors, or to determine a thickness of any covering materials. In an embodiment, the controller 440 stores the calibrated values for future reference and use in calculations by the controller 440 or an external controller. In another embodiment, the controller 440 sends the calibrated value to an external controller, in communication with the controller 440 via its wireless transceiver, for use in calculations performed by the external controller.

The reflector 425 increases the effective distance (twice the illustrated distance) that signals travel when emitted from the transducer 420, reflected from the reflector 425, and received back at the transducer 420. The increased effective distance separates the first signal, that propagates through the material, from additional signals received over time, increasing performance. The distance between the transducer 420 and the reflector 425 also allows liquid to sufficiently enter the space provided by the channel 450 between the transducer 420 and the reflector 425.

Providing an effective distance that is twice the path length allows for the meter 400 to achieve increased sensitivity in determining attenuation in low-attenuation materials or liquids. Conversely, for high-attenuation materials or liquids such as a slurry with solid particles in suspension, having an effective distance double the path length increases the chance of the emitted signal being partially or totally attenuated by the liquid before returning to the transducer 420. Accordingly, the embodiment illustrated in FIG. 4 is well-suited to low-attenuation materials, and other embodiments such as the embodiment of FIG. 1 are well-suited to high-attenuation materials. Effects of thermal expansion with temperature also can be more apparent in the embodiment of FIG. 4 compared to FIG. 1, which can be calibrated to cancel the thermal expansion effects.

FIG. 5 illustrates a cross-section side view of a meter 500 including a wedge structure 560 according to an embodiment. The wedge structure 560 is coupled to a housing 510. The wedge structure 560 includes an exposed surface 564 to come in contact with a liquid, and a plurality of facets. The meter 500 includes a first transducer 520 disposed in the housing 510. The first transducer 520 is coupled to a first facet 566 of the wedge structure at a first angle of incidence 561 relative to the exposed surface 564. The meter 500 also includes a second transducer 530 disposed in the housing 510. The second transducer 530 is coupled to a second facet 567 of the wedge structure 560 at a second angle of incidence 562 relative to the exposed surface 564.

The meter 500 is structured to assume the illustrated orientation when placed in a liquid. The meter 500 has a buoyancy to float at a surface of the liquid, with the wedge structure 560 directed downward as illustrated, away from a floor of a container containing the liquid. The housing 510 is generally formed with a cylindrical shape, and includes a first raised edge 512 and a second raised edge 513 to protect the wedge structure 560. In other embodiments, the meter 500 assumes a different position in the liquid. The first raised edge 512 and a second raised edge 513 can be elongated to serve as standoffs, for embodiments where the meter 500 rests on a floor of the container containing the liquid. In such embodiments, the first raised edge 512 and the second raised edge 513 provide spacing for liquid to contact the exposed surface 564 of the wedge structure 560.

The controller 540 reads first output from the first transducer 520, and second output from the second transducer 530. The controller 540 uses the outputs to determine a density of the liquid in contact with the exposed surface 564 of the wedge structure 560. In an embodiment, the controller 540 determines the density by performing look ups and calculations based on the first output and the second output. In another embodiment, the controller 540 reads the various outputs and uses a wireless transceiver to transmit the various outputs to an external controller which can perform look ups and calculations. In yet another embodiment, the controller 540 performs some look ups or calculations, and communicates with the external controller that performs other look ups or calculations. For example, the controller 540 can communicate with an external controller, which provides information to the controller 540 about the type of liquid and properties of the liquid, while the controller 540 uses that information along with sensed sensor output information to perform density calculations or other calculations.

The meter 500 is illustrated as including a third transducer 535. Embodiments of the meter 500 can include two transducers or greater than three transducers. The illustrated third transducer 535 is disposed in the housing 510 coupled to a third facet 568 of the wedge structure 560 at a third angle of incidence 563 relative to the exposed surface 564. The meter 500 can include additional transducers, such as a transducer to sense temperature of the liquid.

The illustrated embodiment of meter 500 is formed as an elongated package design, providing the exposed surface 564 of the wedge structure 560 as a wedge interface between the wedge structure 560 and a liquid in which the meter 500 is to be immersed. The first transducer 520, the second transducer 530, and the third transducer 535 can be ultrasonic transducers that are internal to the meter 500.

The wedge structure 560 is formed from a known material such as a cross-linked polystyrene. The meter 500 is arranged to position the wedge structure 560 in direct contact with a liquid, to enable the controller 540 to determine the density of the liquid based on the reflection of ultrasonic waves off the wedge/liquid interface at multiple angles (e.g., multiple angles of incidence). The wedge structure 560 has known acoustic properties and is chemically compatible with the liquid to be analyzed. In an embodiment, the wedge structure 560 is formed of Rexolite™, a cross-linked polystyrene.

The controller 540 is structured to determine density of the liquid based on various calculations. Example techniques and calculations pertaining to use of wedge structures with ultrasonic transducers can be found at pages 22-26 of "Development of a Density Sensor for In-Line Real-Time Process Control and Monitoring of Slurries during Radioactive Waste Retrieval and Transport Operations at DOE Sites," J. A. Bamberger, M. S. Greenwood, PNNL-13719 UC-721, which pages are herein incorporated by reference.

Figure 6:
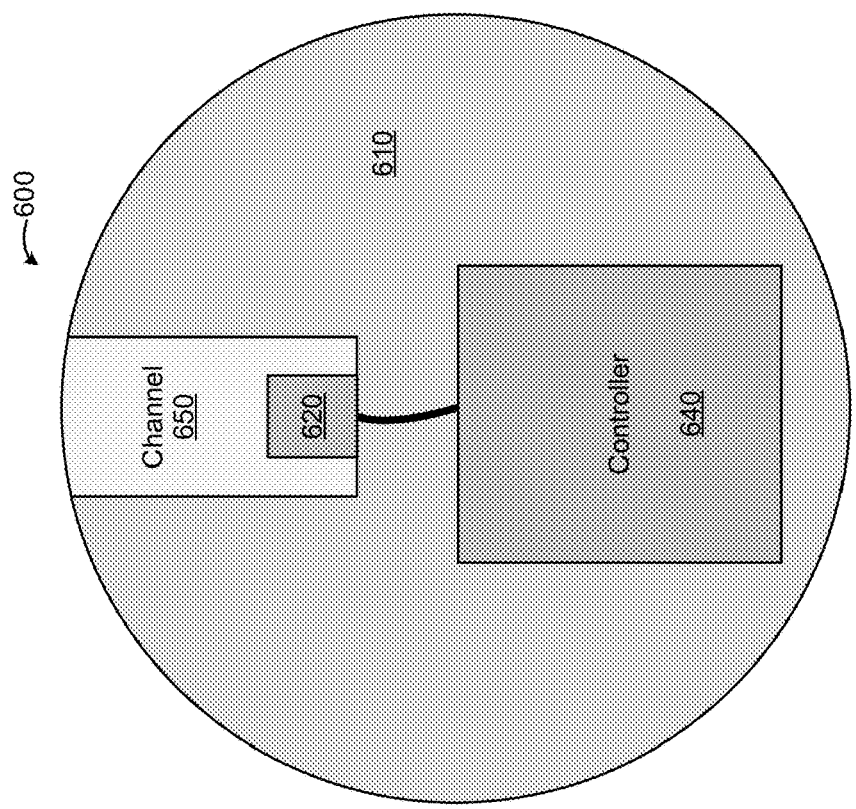
FIG. 6 illustrates a cross-section side view of a meter including a spherical housing and a channel according to an embodiment.

FIG. 6 illustrates a cross-section side view of a meter 600 including a spherical housing 610 and a channel 650 according to an embodiment. The meter 600 also includes a first transducer 620 disposed in the channel 650 and coupled to the controller 640. The channel 650 is depicted from a side view showing a depth and width of the channel 650 relative to the housing 610.

Figure 7:
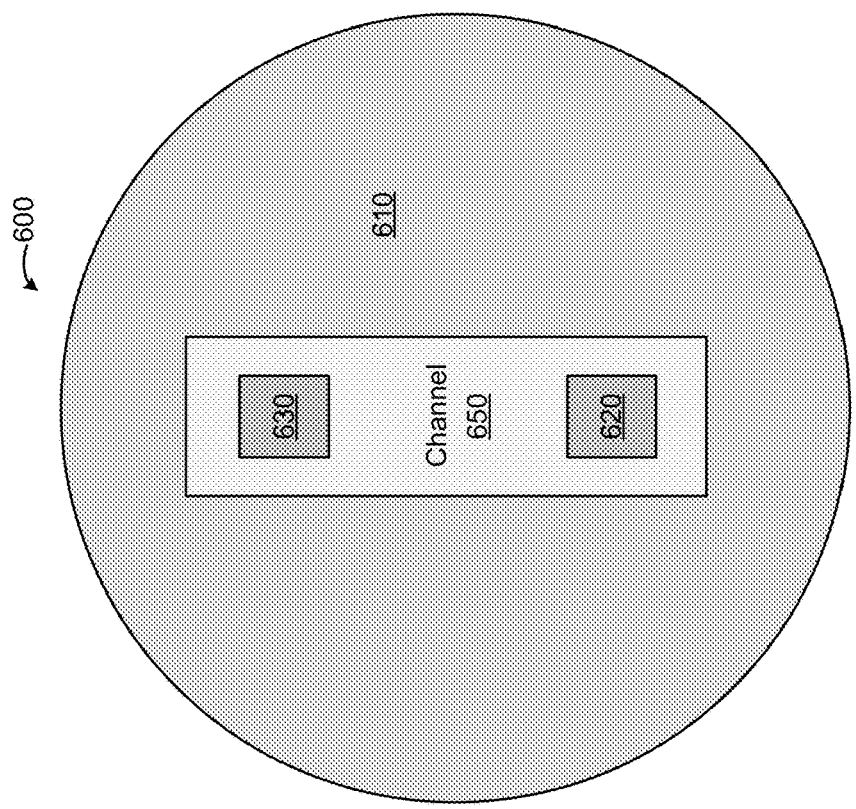
FIG. 7 illustrates a cross-section top view of the meter of FIG. 6 including the spherical housing and the channel according to an embodiment.

FIG. 7 illustrates a cross-section top view of the meter 600 of FIG. 6 including the spherical housing 610 and the channel 650 according to an embodiment. The channel 650 is depicted from a top view showing a width and length of the channel 650 relative to the housing 610. The meter 600 is illustrated to show the first transducer 620 and a second transducer 630 disposed in the channel 650 and separated from each other by a distance. The channel 650 protects the first transducer 620 and a second transducer 630 from damage and establishes a space for liquid to flow between the first transducer 620 and a second transducer 630.

The spherical package design of the meter 600 is designed for submersion. The spherical shape of housing 610 protects the components of the meter 600, including the first transducer 620 and others. The spherical housing 610 and channel 650 enable the meter 600 to roll on a floor of a container of liquid, or contact walls of the container, while protecting the components such as the transducers from collisions. The spherical package design also protects from wear or damage a liquid container, such as a flask in which the meter is placed with the liquid to be measured. For example, the meter 600 can safely roll along a floor or wall of the container when the flask is under rotation during a distillation process for an extended time.

Figure 8:
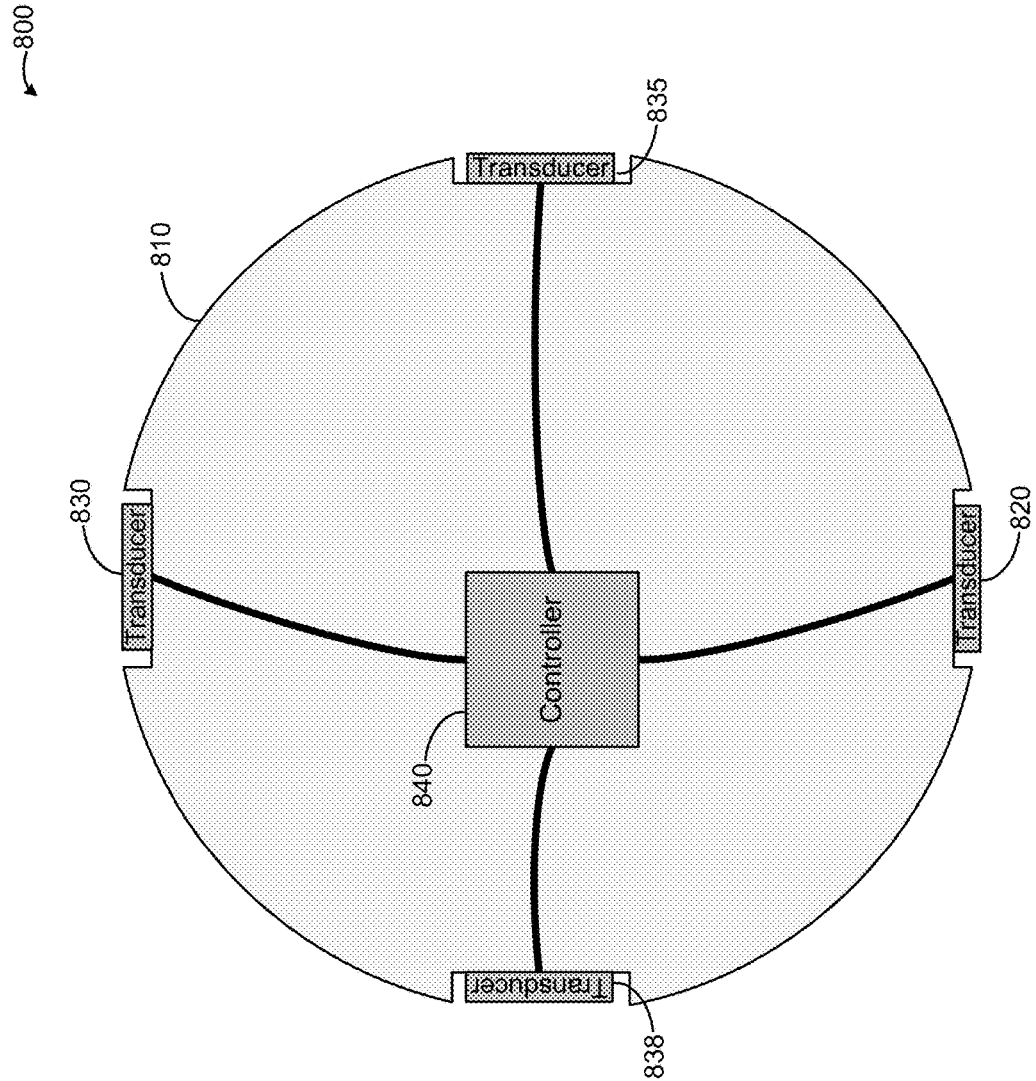
FIG. 8 illustrates a cross-section side view of a meter including a spherical housing and a first transducer, a second transducer, a third transducer, and a fourth transducer according to an embodiment.

FIG. 8 illustrates a cross-section side view of a meter 800 including a spherical housing 810 and a first transducer 820, a second transducer 830, a third transducer 835, and a fourth transducer 838 according to an embodiment. The first transducer 820, the second transducer 830, the third transducer 835, and the fourth transducer 838 are coupled to controller 840. The meter 800 is designed to float at a surface of a liquid, with at least a portion of the meter above the surface. The first transducer 820, the second transducer 830, the third transducer 835, and the fourth transducer 838 are arranged such that at least two transducers remain submerged, regardless of an orientation of the meter 800 when floating at the surface of the liquid. In an embodiment, the meter 800 is weighted or otherwise configured to orient itself at a desired orientation when floating at a surface or submerged in a liquid, or when contacting a floor of a container of liquid.

In an embodiment, the first transducer 820, the second transducer 830, the third transducer 835, and the fourth transducer 838 are pressure sensors. The controller 840 includes sensors such as accelerometers or gyroscopes to determine an orientation of the meter 800. The meter also includes sensors, such as electrode pairs next to each transducer, to determine whether a given transducer is submerged. The controller 840 identifies at least two transducers that are submerged, determines their relative depth differences based on the meter's orientation, and determines the density of the liquid based on the pressure differential between the at least two transducers that are submerged.

Figure 9:
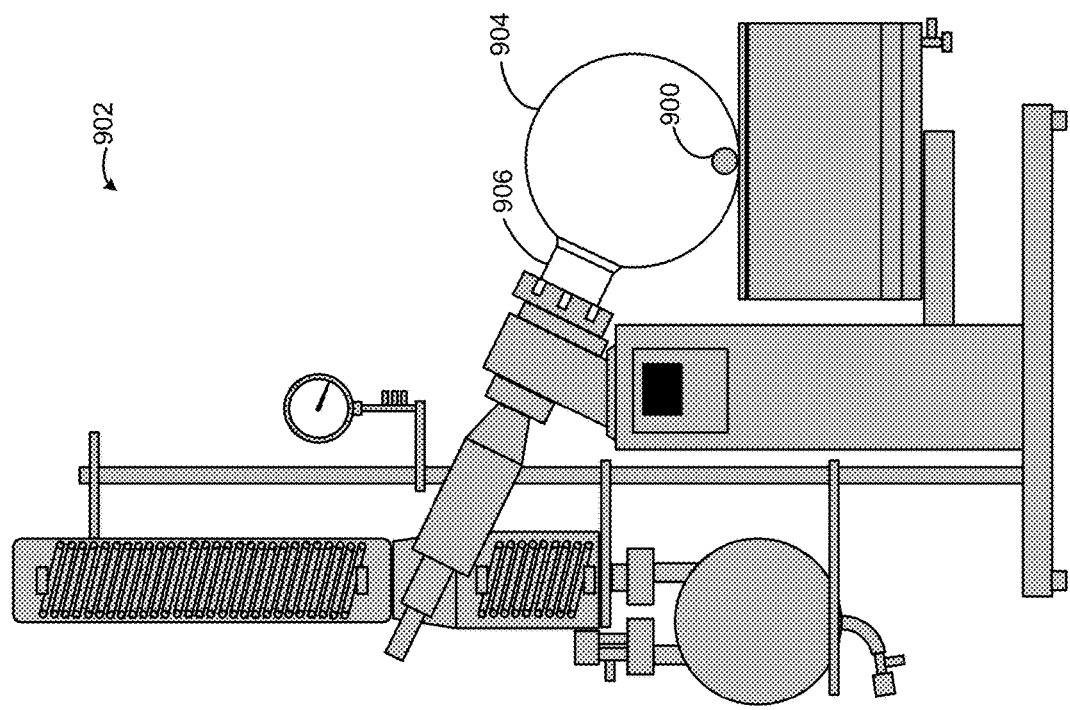
FIG. 9 illustrates a side view of a rotary evaporator including a meter according to an embodiment.

FIG. 9 illustrates a side view of a rotary evaporator 902 including a meter 900 according to an embodiment. The meter 900 has been placed within an evaporating flask 904 of the rotary evaporator 902. The relatively small size of the meter 900 enables the meter 900 to pass through the narrow glass joint 906 coupling the evaporating flask 904 to the rotary evaporator 902.

The meter 900 is relatively small and robust, dimensioned to be inserted into the evaporating flask 904 of the rotary evaporator 902. The meter 900 includes a wireless transceiver to remotely or wirelessly report density and temperature of the liquid, e.g., to an external controller such as a computer or the rotary evaporator 902. The meter 900 is shown as a spherical capsule in an empty evaporating flask 904. When the evaporating flask 904 is filled with liquid that is under distillation, the meter 900 can be submerged in or can float at a surface of the liquid, to monitor the liquid without interruption during processing, e.g., while the evaporating flask 904 is rotating during distillation under vacuum.

The relatively small size of the meter 900 is suitable for being placed into the evaporating flask 904. The meter 900 is compatible with various sizes of evaporating flask 904, such as a 2 L receiving flask having a 24/40 glass joint. Such evaporating flasks 904 can have tapered joints with a diameter of approximately 20 mm at a narrow end. The meter 900 is dimensioned to fit through such joints or openings. During operation of the rotary evaporator 902 to carry out a rotary evaporator (rotovap) process, the evaporating flask 904 spins while oriented at an angle of approximately 45 degrees. Operation of the rotary evaporator 902 is a challenging environment to perform measurements, due to the dimensions of the evaporating flask 904, and also due to the orientation and rotation of the evaporating flask 904. Embodiments of the meter 900 can accommodate such challenging environments by, e.g., floating while keeping the transducers submerged (e.g., based on a generally cylindrical embodiment shown in FIG. 11). In another embodiment, the meter accommodates such challenging environments by sinking and rolling (e.g., based on a spherical embodiment shown in FIG. 10). As described herein, embodiments of the various meters include transducers that are fixed in the housing relative to one another. For example, FIG. 1 illustrates how the distance is fixed, between the first transducer 120 and the second transducer 130, regardless of the orientation of the meter 100. Other embodiments similarly maintain fixed distances between transducers. Accordingly, changes in motion or orientation of the meter 900 inside the evaporating flask 904 do not affect measurements of the density of the liquid, because the meter 900 is configured to maintain direct contact between its transducers and the liquid. Furthermore, for embodiments where pressure differential is used based on multiple pressure transducers, the meter 900 can determine its orientation to derive the relative depths of the multiple pressure transducers, regardless of the motion or orientation of the meter 900.

The meter 900 can be used during the process of distillation of a liquid solution of hydrogen peroxide in water. The distillation process involves water being removed from the evaporating flask 904, increasing the concentration of hydrogen peroxide in the liquid solution. As the liquid solution becomes more concentrated, the density of the solution increases. The meter 900 can determine the concentration of a solution of hydrogen peroxide in water using the measured density and temperature. Embodiments of the meter 900 can incorporate and perform operations related to hydrogen peroxide according to equations as described at least in pages 7-18 of Schumb, W. C., C. N. Satterfield and R. L. Wentworth (1953) "Hydrogen Peroxide—Part Two," Office of Naval Research, AD022243, which pages are herein incorporated by reference.

A controller of the meter 900 samples its first transducer, second transducer, third transducer, or other transducers over time to identify density changes in the liquid corresponding to concentration changes of hydrogen peroxide over time as the liquid undergoes the distillation process. The meter 900 can indicate to an external controller, such as the rotary evaporator 902, when the desired concentration of hydrogen peroxide is reached, indicating to the external controller that it is time to automatically halt the distillation process.

Figure 10:
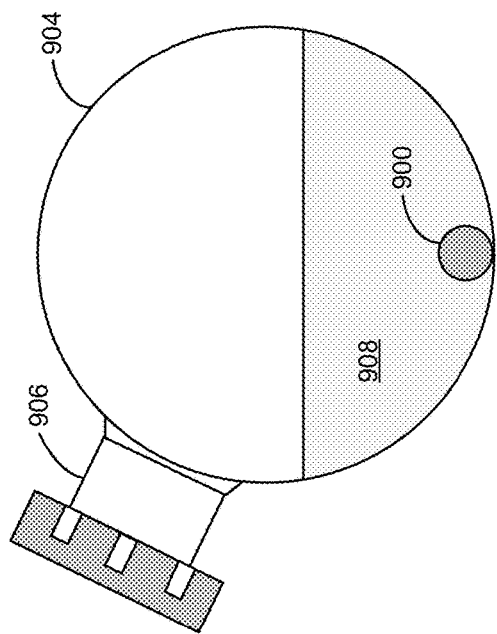
FIG. 10 illustrates a side view of the evaporating flask from the rotary evaporator of FIG. 9 including the meter submerged in liquid according to an embodiment.

FIG. 10 illustrates a side view of the evaporating flask 904 from the rotary evaporator 902 of FIG. 9, including the meter 900 submerged in liquid 908 according to an embodiment.

The illustrated meter 900 has a housing formed as a spherical package. The meter 900 is configured to sink when immersed in the liquid 908. The meter 900 contacts, and rolls along, a bottom of the evaporating flask 904 containing the liquid 908. Such behavior is facilitated by the spherical package design of the illustrated meter 900.

Figure 11:
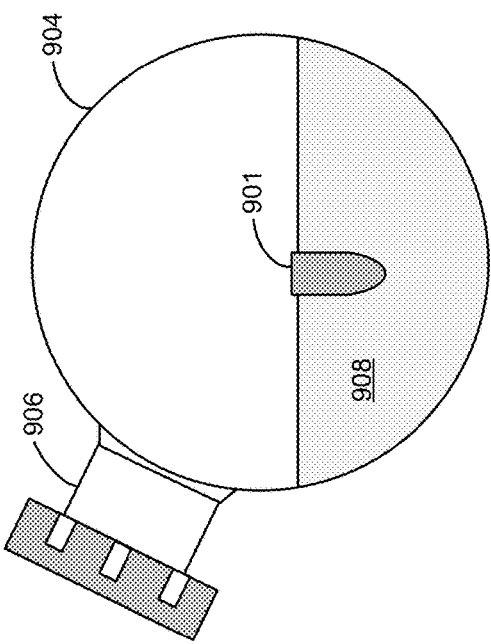
FIG. 11 illustrates a side view of the flask from the rotary evaporator of FIG. 9 including a meter floating in liquid according to an embodiment.

FIG. 11 illustrates a side view of the evaporating flask 904 from the rotary evaporator 902 of FIG. 9 including a meter 901 floating in liquid 908 according to an embodiment.

The illustrated meter 901 is buoyant when placed in the liquid 908. This buoyancy causes the meter 901 to remain suspended away from the floor of the evaporating flask 904 containing the liquid, while causing the first transducer and the second transducer to remain submerged in the liquid. The meter 901 remains at the indicated vertical orientation, maintaining its transducers at the same respective depths in the liquid. Such behavior is facilitated by the elongated package design, and buoyancy, of the illustrated meter 901.

The meter 900 or the meter 901 can be designed with specified buoyancies, to enable the meter to remain submerged in a given liquid at a desired depth. Different meters can be customized with different buoyancies suitable for different liquids or submersion depths, with corresponding different liquid densities. Embodiments of the meters can have a neutral buoyancy at a given density of the liquid, to allow the meter to avoid contact with a container floor while remaining submerged at a depth corresponding to the density of the neutral buoyancy. Meters can be provided with a range of neutral buoyancies, such as a kit having multiple meters covering a range of housing types and buoyancies suitable for a range of different types of liquids or concentrations of liquids.

Figure 12:
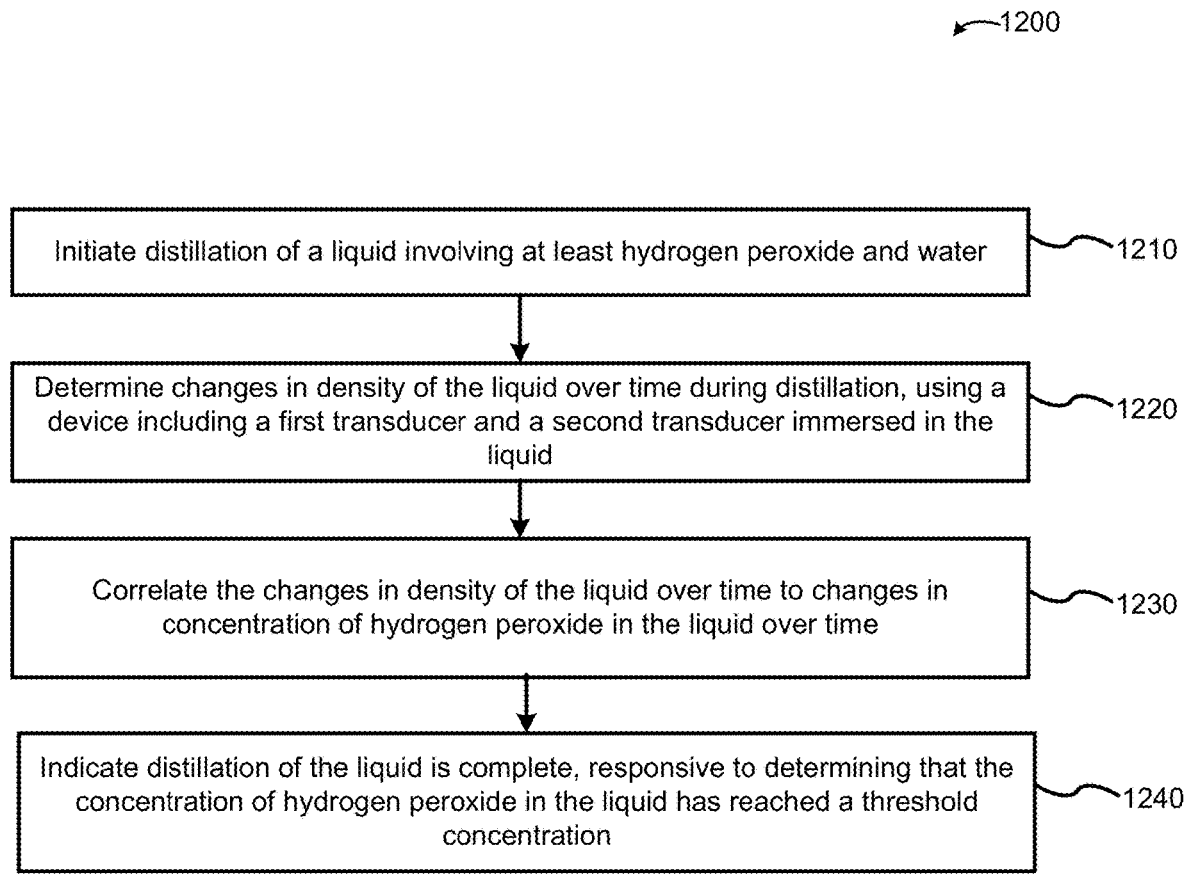
FIG. 12 illustrates a flowchart to monitor a concentration of hydrogen peroxide in a liquid according to an embodiment.

FIG. 12 illustrates a flowchart 1200 to monitor a concentration of hydrogen peroxide in a liquid according to an embodiment. Distillation of a liquid involving at least hydrogen peroxide and water is initiated at 1210. For example, a spherical meter is placed in an evaporating flask of a rotary evaporator with a hydrogen peroxide solution liquid. The liquid fills a channel formed in the housing of the meter. The meter identifies a change in status of its electrodes indicating that its transducers are submerged. The meter activates its transducers, including ultrasonic, pressure, or temperature transducers. Changes in density of the liquid are determined over time during distillation, using a first transducer and a second transducer immersed in the liquid, at 1220. For example, a controller of the meter periodically checks a temperature of the liquid and a time of flight measurement for an ultrasonic signal, which is emitted from the first transducer, passes through the liquid, and is detected by the second transducer. The controller determines a density of the liquid based on performing calculations using the sensed time of flight measurement and the sensed temperature. In another embodiment, the meter periodically senses the temperature and time of flight measurement, and transmits the sensed values to an external controller which determines the density of the liquid. Changes in density of the liquid over time are correlated to changes in concentration of hydrogen peroxide in the liquid over time, at 1230. For example, the controller of the meter (or the external controller) uses a lookup table to identify what concentration of the liquid corresponds to a given density, for a solution of hydrogen peroxide and water liquid. Distillation of the liquid is indicated as complete, responsive to determining that the concentration of hydrogen peroxide in the liquid has reached a threshold concentration, at 1240. For example, the controller of the meter, or the external controller, periodically compares the calculated concentration to a target threshold concentration over time. Responsive to the calculated concentration being equal to the target threshold concentration, the controller of the meter, or the external controller, signals that the distillation process is complete. In an embodiment, the controller of the meter, or the external controller, sends a halt signal to a rotary evaporator, to cause the rotary evaporator to halt the distillation process of the liquid.

What is claimed is:
1. A device to determine density, comprising:
   a housing;
   a channel disposed on an outer surface of the housing and formed by the housing, the channel facing outward from the device with no portion of the channel being overlapped by the housing, to readily admit a liquid directly into the channel when the device is immersed in the liquid;
a first transducer disposed in the channel at a first position;
a second transducer disposed in the channel at a second position located a distance from the first transducer and having a direct unobstructed line of sight between the first transducer and the second transducer along the channel; and
a controller that reads a first output from the first transducer, and a second output from the second transducer, and determines a density of the liquid based on the first output, the second output, and the distance;
wherein the controller determines the density of the liquid based on performing a transmission measurement, across the distance through the liquid between the first transducer and the second transducer along the direct unobstructed line of sight along the channel, to measure time-of-flight information corresponding to a measured velocity that is proportional to the time-of-flight information, a bulk modulus of the liquid, and the density of the liquid; and
wherein the device, when placed in the liquid, positions the first transducer at a first depth in the liquid and the second transducer at a second depth in the liquid different than the first depth, corresponding to the distance.

2. The device of claim 1, further comprising a plurality of electrodes coupled to the housing, wherein the controller identifies a status of the plurality of electrodes and activates the first transducer and the second transducer, responsive to determining that the device is immersed in the liquid based on the status of the plurality of electrodes.

3. The device of claim 1, further comprising a third transducer to sense a temperature of the liquid in which the device is immersed, wherein the controller reads third output from the third transducer and determines the density of the liquid based on the first output, the second output, the third output, and the distance.

4. The device of claim 3, wherein the controller determines a distance adjustment corresponding to the temperature, and adjusts the distance between the first transducer and the second transducer, as used to determine the density of the liquid, according to the distance adjustment, to correct for thermal expansion of the device.

5. The device of claim 3, wherein the controller determines the density of the liquid based on the temperature, by correcting for temperature-dependent changes in properties of the liquid including bulk modulus of the liquid.

6. The device of claim 1, wherein the controller identifies a temperature of the liquid, identifies a bulk modulus corresponding to a type of the liquid, and determines the density of the liquid based on the temperature of the liquid and the bulk modulus of the liquid.

7. The device of claim 1, wherein the first transducer and the second transducer are ultrasonic transceivers.

8. The device of claim 1, wherein the first transducer and the second transducer are pressure sensors.

9. The device of claim 1, wherein the housing comprises an elongated package having a first end that is ovoid and a second end that is cylindrical.

10. The device of claim 1, wherein the device is buoyant when placed in the liquid to not contact a floor of a container of the liquid, while causing the first transducer and the second transducer to remain submerged in the liquid.

11. The device of claim 1, wherein the housing comprises a spherical package, and wherein the device is configured to sink when immersed in the liquid, and contact and roll along a bottom of a container of the liquid.

12. The device of claim 1, wherein the controller is configured to:
sample the first transducer and the second transducer over time to periodically check measurements by the first transducer and the second transducer;
identify density changes in the liquid over time based on periodically checking the measurements;
correlate the density changes in the liquid to concentration changes of hydrogen peroxide over time as the liquid undergoes a distillation process;
periodically compare the concentration changes to a target threshold concentration over time; and
signal, responsive to the concentration changes being equal to the target threshold concentration, that a distillation process is complete.

13. The device of claim 1, wherein the controller includes a transceiver to wirelessly transmit through the liquid.

14. A device to perform measurements, comprising:
a housing;
a channel disposed on an outer surface of the housing and formed by the housing, the channel facing outward from the device with no portion of the channel being overlapped by the housing, to readily admit a liquid directly into the channel when the device is immersed in the liquid;
a transducer disposed in the channel at a first position;
a reflector disposed in the channel at a second position located a distance from the transducer and having a direct unobstructed line of sight between the transducer and the reflector along the channel; and
a controller that reads output from the transducer and determines a density of the liquid based on the output and the distance;
wherein the controller determines the density of the liquid based on performing a transmission measurement, across the distance through the liquid between the transducer and the reflector along the direct unobstructed line of sight along the channel, to measure time-of-flight information corresponding to a measured velocity that is proportional to the time-of-flight information, a bulk modulus of the liquid, and the density of the liquid; and
wherein the device, when placed in the liquid, positions the transducer at a first depth in the liquid and the reflector at a second depth in the liquid different than the first depth, corresponding to the distance.

15. The device of claim 14, wherein:
the housing includes a channel to admit the liquid;
the transducer is disposed in the channel at the first position; and
the reflector is disposed in the channel at the second position.

16. A device to sense properties of liquids, comprising:
a housing;
a channel disposed on an outer surface of the housing and formed by the housing, the channel facing outward from the device with no portion of the channel being overlapped by the housing, to readily admit a liquid directly into the channel when the device is immersed in the liquid;
a first transducer disposed in the channel at a first position;
a second transducer disposed in the channel at a second position located a distance from the first transducer and having a direct unobstructed line of sight between the first transducer and the second transducer along the channel;
a controller coupled to the first transducer and the second transducer to read a first output from the first transducer, and a second output from the second transducer corresponding to a transmission measurement, across the distance through the liquid between the first transducer and the second transducer along the direct unobstructed line of sight along the channel; and
a transceiver coupled to the controller, the controller being configured to direct the transceiver to transmit the first output and the second output through the liquid to an external receiver, for use in determining a density of the liquid;
wherein the device, when placed in the liquid, positions the first transducer at a first depth in the liquid and the second transducer at a second depth in the liquid different than the first depth, corresponding to the distance.

17. The device of claim 16, wherein the first transducer is a refractive index transducer that includes a Fabry-Pérot optical cavity to sense the index of refraction of the liquid.

18. The device of claim 16, wherein the first transducer is a refractive index transducer that includes a white-light interferometer to sense the index of refraction of the liquid.

19. The device of claim 16, wherein the first transducer is a refractive index transducer that includes an optical microcavity to sense the index of refraction of the liquid.

20. The device of claim 16, wherein the controller is configured to determine at least one ingredient of the liquid includes hydrogen peroxide.

21. The device of claim 16, wherein the controller is configured to determine at least one ingredient of the liquid includes ethanol.

22. A method to determine density, comprising:
immersing a meter in a liquid of an evaporating flask of a rotary evaporator, to allow the liquid into a channel disposed on an outer surface of a housing of the meter, the housing facing outward from the meter with no portion of the channel being overlapped by the housing;
reading, by a controller, output from at least one transducer disposed in the channel and having a direct unobstructed line of sight along the channel, the output corresponding to a transmission measurement, across a distance through the liquid along the direct unobstructed line of sight along the channel; and
transmitting, by a transceiver coupled to the controller, the output through the liquid to an external receiver, for use in determining a density of the liquid.

23. The method of claim 22, further comprising transmitting a halt signal to the rotary evaporator responsive to the density of the liquid reaching a target threshold.

24. The method of claim 22, wherein the liquid includes at least hydrogen peroxide and water, the method further comprising determining a concentration of hydrogen peroxide in the liquid during distillation, based on the density.

25. The method of claim 22, wherein the meter comprises electrodes, the method further comprising detecting, by the meter, a change in status of its electrodes indicating that its transducers are submerged; and activating its transducers responsive to the detecting.

26. The method of claim 22, wherein the at least one transducer comprises ultrasonic, pressure, or temperature transducers.

27. The method of claim 22, wherein the meter comprises a first transducer and a second transducer, the method further comprising determining a time of flight measurement for a signal to pass through the liquid through the channel from the first transducer to the second transducer.

28. The method of claim 22, wherein the meter comprises a temperature transducer, the method further comprising sensing a temperature.

29. The method of claim 22, further comprising accessing a lookup table to determine what concentration of the liquid corresponds to a given density of the liquid.

30. The method of claim 29, further comprising indicating a distillation process as complete, responsive to determining that a concentration of hydrogen peroxide in the liquid has reached a threshold concentration.

* * * * *